United States Patent [19]
Ala-Huikku et al.

[11] Patent Number: 5,461,018
[45] Date of Patent: Oct. 24, 1995

[54] PROCATALYST COMPOSITION FOR THE POLYMERIZATION OF ALPHA-OLEFINES, PREPARATION AND USE

[75] Inventors: Sirpa Ala-Huikku, Helsinki; Marjaana Lommi, Kulloo; Eero Iiskola, Porvoo, all of Finland

[73] Assignee: Borealis Holding A/S, Lyngby, Denmark

[21] Appl. No.: 214,656

[22] Filed: Mar. 16, 1994

Related U.S. Application Data

[63] Continuation of Ser. No. 853,733, filed as PCT/FI90/00287, Nov. 27, 1990, abandoned.

[30] Foreign Application Priority Data

Nov. 28, 1989 [FI] Finland .................................. 895703

[51] Int. Cl.⁶ .............................. B01J 21/06; B01J 21/10
[52] U.S. Cl. ........................ 502/115; 502/113; 502/116; 502/152; 585/512
[58] Field of Search .................... 502/104, 114, 502/115, 113, 116, 117, 119, 120, 124, 125, 126, 127, 152; 585/512

[56] References Cited

U.S. PATENT DOCUMENTS

| | | | |
|---|---|---|---|
| 4,326,988 | 4/1982 | Welch et al. | 252/429 B |
| 4,363,746 | 12/1982 | Capschew | 252/429 B |
| 4,391,736 | 7/1983 | Capshew | 252/429 B |
| 4,399,055 | 8/1983 | Matuura et al. | 252/429 B |
| 4,410,671 | 10/1983 | Welch et al. | 526/119 |
| 4,468,477 | 8/1984 | Count et al. | 502/119 |
| 4,530,913 | 7/1985 | Pullukat et al. | 502/104 |
| 4,578,440 | 3/1986 | Pullukat et al. | 526/128 |
| 4,833,111 | 5/1989 | Nowlin | 502/107 |
| 4,935,394 | 6/1990 | Chang | 502/120 |
| 5,064,798 | 11/1991 | Chang | 502/111 |
| 5,275,993 | 1/1994 | Fujita et al. | 502/125 |
| 5,298,474 | 3/1994 | Luciani et al. | 502/120 |

FOREIGN PATENT DOCUMENTS

| | | | |
|---|---|---|---|
| 0055605 | 7/1982 | European Pat. Off. | C08F 10/02 |
| 0117929 | 9/1984 | European Pat. Off. | C08F 10/00 |
| 0123510 | 10/1984 | European Pat. Off. | C08F 10/00 |
| 0174102 | 3/1986 | European Pat. Off. | C08F 10/00 |
| 0173488 | 3/1986 | European Pat. Off. | C08F 10/00 |
| 0173471 | 3/1986 | European Pat. Off. | C08F 10/00 |
| 0173485 | 3/1986 | European Pat. Off. | C08F 4/64 |
| 0185521 | 6/1986 | European Pat. Off. | C08F 10/00 |
| 70418 | 3/1986 | Finland . | |
| 70417 | 3/1986 | Finland | C08F 4/64 |
| 78113 | 2/1989 | Finland . | |
| 8803258 | 9/1988 | WIPO | C08F 4/64 |

*Primary Examiner*—Anthony McFarlane
*Attorney, Agent, or Firm*—Dressler, Goldsmith, Shore & Milnamow, Ltd.

[57] ABSTRACT

The present invention relates to a procatalyst composition for the polymerization of alfa-olefines, which has been prepared in steps, in which is arranged a carrier agent based on at least one inorganic oxide, having few or no hydroxyl groups on its surface, and the carier agent is reacted with the magnesium compound and one or more transition metal compounds of the groups IVB and VB of the periodic table. It has been observed that such a catalyst is most-advantageous when a) this carrier agent is impregnated with a mixture of the Mg compound and one or more compounds of a transition metal of the groups IVb or Vb of the periodic table, which dissolves the Mg compound, and b) by chlorinating with a compound that does not contain titanium so that 1) the carrier is first treated with a mixture in the form of a solution of the Mg compound and the transition metal compound and the product thus obtained is chlorinated, or 2) the carrier is first chlorinated and subsequently treated with the above mixture in the form of a solution, or 3) the Mg compound and the transition metal compound are impregnated into the carrier without any separate dissolving and the product thus obtained is chlorinated.

7 Claims, No Drawings

PROCATALYST COMPOSITION FOR THE POLYMERIZATION OF ALPHA-OLEFINES, PREPARATION AND USE

This application is a continuation of application Ser. No. 07/853,733, filed as PCT/FI90/00287, Nov. 27, 1990, now abandoned.

The present invention relates to a procatalyst composition which is suitable for homo and copolymerization of α-olefines.

The invention also relates to a method for preparing such a procatalyst composition and to its use jointly with an organometallic cocatalyst compound for the polymerization of α-olefines.

Generally the Ziegler-Natta catalyst system is used for the polymerization of olefines. This system consists of a so-called procatalyst and a cocatalyst. The procatalyst is a component which is based on a compound of a transition metal of any of the groups IVB-VIII of the periodic table of elements. The cocatalyst, again, is a component based on an organometallic compound of a metal of any of the groups IA-IIIA of the periodic table of elements. Generally, electron donor compounds improving and modifying the catalytic properties also belong to the catalyst system.

When preparing heterogenic polymerization catalysts, it is usual to use a carrier compound as the component improving the polymerization activity of the procatalysts, the transition metal compound being layered onto this carrier compound. Usual carrier compounds are based on silicon dioxide, aluminium oxide, magnesium oxide, titanium oxide, their mixtures, carbon in various forms, and different kinds of polymers. Magnesium compounds, such as alkoxides, hydroxides, hydroxy halogenides and halogenides have proved to be important carrier compounds, and the latter, magnesium chloride in particular, have lately become the major carrier components of procatalyst compositions.

As magnesium compounds and especially magnesium halogenides are not, in their basic crystal form, activated very efficiently by a transition metal compound, their crystal structure has to be deformed.

Conventionally, the deformation of the crystal structure is carried out e.g. by grinding in a ball mill, whereby the typical results is a finely-divided powder having a large specific surface, in which the crystal lattices of the particles are strongly deformed. The usual grinding method however has the disadvantage of consuming extremely much energy, of causing wear and corrosion in the equipment and of being good for the preparation of a catalyst only by a laborious batch process.

A more modern way of providing a deformed crystal structure of a magnesium compound like magnesium halogenide, and thus of increasing its activability by transition metal compounds, is to modify it chemically. The magnesium compound, the possible electron donor and the transition metal compound are then mutually reacted, often in a solution, into easily isolated procatalyst compositions. However, the method does not provide sufficient amorphous procatalyst composition, while the composition is crystallised during the preparation more or less spontaneously and does not subsequently alter its morphology essentially.

A third means of providing a deformed or amorphous crystal structure of a magnesium compound is layering the magnesium compound, the transition metal compound and optionally an electron donor on an essentially inert carrier agent. Such a method has been described in the following specifications, among others.

The U.S. Pat. No. 4,363,746 describes as one of its embodiments reacting of untreated silica with a complex of magnesium chloride and transition metal alcoholate, reacting of the product obtained with an organoaluminium compound, like organoaluminium halogenide, and eventually activation of the solid intermediate product obtained with a transition metal halogenide.

The same technique is represented by the U.S. Pat. No. 4,391,736, relating to the removal of surface hydroxyles of a carrier agent of silica type by means of an organometallic compound, such as organoaluminium halogenide, reacting of the hydroxy-free carrier obtained with a complex of magnesium dihalogenide tetra-alkyl titanate and activating the solid reaction product obtained with titanium tetrahalogenide.

The WO patent application 89/02446 describes the drying of silica and removal of its surface hydroxyles by means of an agent reacting with hydroxyle such as a halogenide or an organosilica compound, bringing the agent pretreated in this manner into contact with an organomagnesium compound like an alkoxy magnesium compound, further reacting of the produced intermediate product with an organotitanium compound or an organotitanate and finally treating the product with titanium halogenide.

The GB patent specification 2 102 438 describes the dissolving of a magnesium halogenide in a titanium alkoxide compound in heptane, crystallizing of the mixture with a polymeric silicon compound and using the powder thus obtained as a catalyst carrier, which is activated by a liquid titanium compound containing halogen.

The four specifications above describe the preparation of a solid procatalyst composition in two titanization steps, which are very difficult and sensitive to impurities, among others.

The U.S. Pat. No. 4,530,913 and 4,578,440 disclose the treatment of the hydroxylic surface of a silica or aluminium oxyde carrier with a halogen-free organosilica compound, the treatment of the reaction product obtained with an organometallic compound, which is based on magnesium or magnesium and aluminium, and eventually activation of the reaction product with a transition metal compound, the two latter steps being interchangeable.

The EP patent specification 123 510 describes the drying of silica or aluminium oxyde and the removal of their surface hydroxyles by means of an organosilica compound, the reacting of the treated silica or aluminium oxyde with an organometallic compound, which is based on magnesium or magnesium and aluminium, and finally activation of the reaction product with a transition metal compound.

The three last-mentioned specifications have the disadvantage of using an organometallic compound as a magnesium compound, which does not in itself contain the halogen required for forming a complex having catalyst activity. In order to achieve catalytically activating interaction between the magnesium and the transition metal, the use of a transition metal halogenide like titanium tetrachloride or titanium alkoxy chloride is required. The sensitivity of such a reagent e.g. to air humidity greatly hampers the activation of the carrier agent.

The EP patent application 45969 describes the solving of magnesium chloride and titanium tetraethoxyde in hexane and the crystallization of the mixture with ethyl aluminium sesquichloride. After decantation, the deposit is elutriated in hexane, prepolymerized with ethene and is treated once more with ethyl aluminium sesquichloride and titanium tetrachloride. The catalyst obtained was used together with triethyl aluminium in the preparation of polyethene. The process of this specification has the disadvantage of an uncontrolled precipitation as well as of several treatments with the transition metal compound.

The purpose of the present invention is to provide a procatalyst composition that is as active as possible. A solid procatalyst composition should also have a suitable particle shape, size and granulometric distribution. These purposes should be achieved with a minimum of effort and without the above inconvenients.

The problem has now been solved by a new procatalyst composition intended for the polymerization of alfa-olefines. The composition is mainly characterized by the facts mentioned in the characterizing part of claim 1. Thus, it has been discovered that a practicable procatalyst composition is easily provided in the following manner. When a carrier agent based on at least one inorganic oxide is set up, having on its surface some or no hydroxyle groups, and then the carrier agent is treated with a magnesium compound and one or more transition metal compounds of the groups IVB and VB of the periodic table into which the magnesium compound is dissolved, and finally a step is carried out, in which the reaction product or mixture of the carrier agent, the magnesium compound and the transition metal compound or compounds are contacted and reacted with a chlorination reagent not containing transition metals, a procatalyst is obtained, which has an optimal chlorine-metal balance in terms of the polymerization result.

The advantage of this invention compared to solutions known in prior art is an easy and simple catalyst preparation method; no time-consuming washing and drying steps are needed and thus the waste amount produced during the catalyst preparation is minimal.

The advantage compared to the U.S. Pat. No. 4,391,736, the catalyst according to the present invention has a good hydrogen sensitivity, a good activity and a good comonomer sensitivity. In addition, the polymers obtained have a narrow molecule weight distribution. The advantage compared to the solutions of the patent applications GB 2 102 438 and EP 45969 A1 is the controlled morphology of the catalyst according to this invention, due to the carrier agent, especially silicon dioxide.

Implementing a solution of magnesium compound and transition metal compound for the treatment of the carrier agent thus surprisingly makes a second and separate activation step with the transition metal compound superfluous, and a mere chlorination will be sufficient. Suitable transition metal compounds are liquid compounds that dissolve magnesium compounds. Such compounds are for instance vanadium oxitrichloride and transition metal alkoxides, such as titanium tetra-alkoxides, advantageously titanium tetrabutoxide.

A second advantage of the supplementary final chlorination step is that instead of an organomagnesium compound magnesium halogenide, advantageously magnesium dichloride, can be used as magnesium compound, thus gaining benefit from its structure in order to achieve a procatalyst composition that is as active as possible.

The carrier agent used in the invention can be any porous inorganic or organic substance. We cite polymers among the oganic carrier agents. Especially advantageous are carrier agents based on oxides of silicon, aluminium, titanium, magnesium and/or chromium. Such carrier agents are e.g. silicon oxide, aluminium oxide, magnesium-oxide, magnesium silicate, titanium oxide, etc. Especially advantageous carrier agents are silicon oxide, aluminium oxide and magnesium silicate or a mixture of them. A silicon dioxide product is the most advantageous of all.

It is advantageous to set up such an inert carrier agent, in which hydroxyle groups have been removed thermally and/or chemically from the surface of the inorganic oxide.

At temperatures below 200° C., the thermal treatment involves water removal and at higher temperatures calcination of the surface hydroxyles. The thermal treatment advantageously takes place at a temperature of c. 100°–1000° C.

The surface hydroxyle groups of the carrier agent are removed chemically by using substances reactive with hydroxyle groups. Such substances are organic silicon, aluminium, zinc, phosphor and/or fluorine compounds. We can mention among appropriate organic silicon compounds as preferable the compounds of the formula $(R_3Si)_2NH$ or the formula $R_nSiX_{4-n}$, in which R is a hydrogen and/or alkyle group, X is a group reacting with the H of the hydroxyle group, like halogen, and n is 1, 2 or 3.

Among preferable organic aluminium compounds can be mentioned the compounds of the formula

$\{R_nAlX_{3-n}\}_m$ in which R is hydrogen and/or a hydrocarbon group containing 1–20 carbon atoms, preferably a lower alkyle group, X is halogen, n is 1, 2 or better 3, and m is 1 or 2. Typical aluminium compounds are trialkyl aluminium such as triisobutyle aluminium, dialkyle aluminium halogenide such as diethyle aluminium chloride and dialkyle aluminium hydride such as diisobutyle aluminium hydride.

Advantageous phosphor compounds removing hydroxyle groups are phosphorous trihalogenides, phosphorous oxitrihalogenides, dialkyle phosphorous halogenides, monoalkyle phosphorous halogenides and diamino-phosphorous oxihalogenides. Appropriate fluorine compounds removing hydroxyle groups are fluoric gas, fluoric hydrogen, boron trifluoride, silicon tetrafluoride and sulphur oxide fluoride.

The most advantageous substances removing hydroxyle groups are organic silicon compounds and organic aluminium compounds and among these, respectively, the most advantageous are hexamethyl disilazane $(CH_3)_3Si_2NH$ and triethyl aluminium $(C_2H_5)_3Al$.

At least the majority of hydroxyle groups having been removed from the surface of the carrier agent, it will be treated with a magnesium compound and one or more of the transition metal compounds of groups IVB and VB of the periodic system of elements, into which the magnesium compound is dissolvable.

This may take place by first adding the magnesium compound and subsequently the transition metal compound, or vice versa. However, it is advantageous to contact a carrier agent containing a few or no surface hydroxyles with a mixture formed of a magnesium compound and one or more compounds of a transition metal of the groups IVB and VB of the periodic table of elements. The mixture is advantageously in the state of a solution, in particular of a hydrocarbon solution, the dissolved substance being possibly a complex of a magnesium compound and a transition metal compound. As mentioned above, the preferable magnesium compound is magnesium chloride and the preferable transition metal compound is tetra-alkyl titanate (titanium tetra-alkoxide) such as tetrabutyl titanate. A vanadium compound, preferably $VOCl_3$, can be used as a transition metal compound.

When the carrier agent containing a few or no surface hydroxyles has been treated with a magnesium compound and one or more transition metal compounds, the reaction product or mixture of the compounds is contacted and reacted with a chlorination reagent free from transition metals. If necessary, this chlorination can be carried out directly after the removal of the hydroxyle groups of the carrier agent, i.e. before it is reacted with the magnesium compound and the transition metal compound.

The chlorination reagent free of the above mentioned transition metal, advantageously that of the last, i.e. third step, is advantageously HCl, $CCl_4$, or particularly a compound of the formula $\{R_nAlCl_{3n}\}_m$, in which R is a hydrocarbon group containing 1–20 carbon atoms, advantageously a lower alkyl group, n is 1 or 2 and m is 1 or 2. Typical aluminium compounds good for chlorination are alkyl aluminium chlorides, such as diethyl aluminium chloride, ethyl aluminium sesquichloride and ethyl aluminium dichloride. The entire group of precatalysts can be chlorinated together or in smaller batches in a separate vessel before the polymerization reactor addition. The amount of precatalyst to be used in the polymerization can be chlorinated into a finished procatalyst composition in the polymerization reactor, before adding the cocatalyst.

The invention also relates to a method for preparing a procatalyst composition of the above type, in which one or more inert solid inorganic carriers are treated, from which the surface hydroxyle groups have been removed thermally or chemically totally or partly by reacting the carrier with the compound removing hydroxyle groups, a) by impregnating the carrier with a mixture of the Mg compound and one or more compounds of a transition metal of the group IVB or VB of the periodic table of elements, which dissolves the Mg compound, and b) by chlorinating with a compound not containing titanium so that 1) the carrier agent is first treated with a mixture in the state of a solution of the Mg compound and the transition metal compound and the product thus obtained is chlorinated, and 2) the carrier agent is first chlorinated and subsequently treated with the above mixture in the form of a solution, or 3) the Mg compound and the transition metal compound are impregnated into the carrier agent without any separate dissolving and the product thus obtained is chlorinated.

The same definitions as the ones for the catalyst composition defined by means of the method are valid for the method of the invention. The method is typically accomplished e.g. by removing the water from one or more inorganic oxides by drying or calcinating at 150°–1000° C. and/or chemically with an organic silicon compound, advantageously with hexamethyl disilazane.

The premixture is prepared by dissolving a magnesium compound, preferably an anhydrous magnesium chloride, into a transition metal compound dissolving this such as titanium alkoxide, preferably titanium tetrabutoxide, at a temperature above 20° C. A hydrocarbon dissolvant may be added to the solution either before or after the dissolving of the magnesium compound.

The molar ratio Ti/Mg is at least 1, advantageously at least 2.

The molar ratio Cl/Ti is c. 1–10, more advantageously c.3–5 and most advantageously c.4.

The premixture is added dropwise into a carrier agent that is essentially free of surface hydroxyles, which remains as a liquid powder throughout the addition. The carrier agent can also be elutriated into hydrocarbon before adding the premixture. The mixture formed of the premixture and the carrier agent is stirred for 1–100 hours at room or a higher temperature.

The components of the premixture can be added into the carrier agent without a separate dissolving so that a magnesium compound, a hydrocarbon dissolvant and a titanium compound are mixed into the carrier compound in any order, after which the precatalyst mixture is stirred for 1–100 hours at room or a higher temperature.

The preprocatalyst obtained is chlorinated with a compound free of titanium by adding the chlorinating compound either directly into the dry preprocatalyst powder or a hydrocarbon slurry of the preprocatalyst. Alkyl aluminium chlorides, ethyl aluminium sesquichloride and ethyl aluminium dichloride are suitable chlorine compounds. The chlorinating compound can be added to the carrier agent either before the addition of premixture or after it.

The present invention also relates to the use of the procatalyst composition of the invention for the homo- or copolymerization of alfa-olefines, in which the polymerization is accomplished with the aid of the above procatalyst composition and an organometallic cocatalyst compound of any of the groups IA-IIA of the periodic table of elements. The cocatalyst compound is advantageously an organometal compound of aluminium, such as trialkyl aluminium, more advantageously triethyl aluminium.

If necessary, an electron donor can be used in the procatalyst composition of the invention. In addition to the procatalyst composition and the cocatalyst, a so-called external electron donor can be used in the polymerization.

The invention is described below with the aid of a number of examples.

PREPARATION OF THE CATALYST

Example 1

A. Preparation of the Premixture

Into 386 mg of anhydrous magnesium dichloride, 2.8 ml of titanium tetrabutoxide was added dropwise during continuous stirring of the mixture. The mixture was boiled in a 120° C. bath for 3 hours in order to dissolve the material completely. 2 ml of pentane was added to the solution.

B. Treating the Carrier Agent with Hexamethyl Disilazane 3.0 grams of silicon dioxide having a Davison degree of 955, was elutriated into 15 milliliters of n-pentane. 1.35 ml of hexamethyl disilazane (HMDS) was added dropwise to the mixture during stirring by means of a magnetic mixer. The mixture was boiled in a 50° C. bath for 60 minutes and dried at the same temperature for ½ hour, and a dry freely flowing powder of the carrier agent was then obtained.

C. Absorbing of the Premixture into Silicon Dioxide

The premixture solution was transferred by siphonage into the carrier agent, during thorough stirring. The dry mixture was further stirred for 1 hour at room temperature after the addition of the solution.

D. Treating the Precatalyst with Ethyl Aluminium Dichloride

One gram of the precatalyst prepared above was elutriated into 3 ml of pentane. 4.91 ml of a 10% by weight pentane solution of ethyl aluminium dichloride was added to the slurry, was stirred for 2 hours at room temperature and was dried by nitrogen blowing for 2 hours. The dry catalyst powder was further stirred at room temperature for 23 hours.

The catalyst composition was: Mg 0.75%, Ti 4.9%, Al 5.6%, Cl 17.7%.

Example 2

Steps A, B and C: the procedure was the same as in example 1, except that 2.2 ml of hexamethyl disilazane was used when treating the silicon dioxide.

D. Treating the Precatalyst with Ethyl Aluminium Dichloride 6.0 ml of a 10% by weight pentane solution of ethyl alumininium dichloride (EADC) was added to one gram of the precatalyst prepared above. The mixture was stirred for 20 minutes and was dried by nitrogen blowing for ½ hour. The dry catalyst powder was further stirred for 23 hours at room temperature.

The catalyst composition was: Mg 0.7%, Ti 4.4%, Al 6.6%. Cl 22.5%.

Example 3

Steps A and C: the procedure was the same as in example 1.

B. Treating the Carrier Agent with Hexamethyl Disilazane

The procedure was the same as in example 1 except that silicon dioxide dehydrated at 150° C. and treated with 0.5 ml HMDS was used.

D. Treating the Precatalyst with Ethyl Aluminium Dichloride

The procedure was the same as in example 2, except that 5.1 ml of a 10% by weight pentane solution of EADC was added to one gram of the precatalyst prepared above.

The catalyst composition was: Mg 0.7%, Ti 3.9%, Al 6.0%, Cl 18.5%.

Example 4

Steps A and C: the procedure was the same as in example 1.

B. Treating the Carrier Agent with Hexamethyl Disilazane

The procedure was the same as in example 1, except that a silicon dioxide dehydrated at 200° C. and treated with 0.8 ml of HMDS was used.

D. Treating the Precatalyst with Ethyl Aluminium Dichloride 1 g of the precatalyst prepared above was elutriated into 3 ml of pentane and 3.9 ml of a 10% by weight pentane solution of EADC was added to the slurry. The mixture was stirred for 20 minutes and was dried in a nitrogen gas flow for ½ hour. The dry catalyst powder was further stirred for 16 hours at room temperature.

The catalyst composition was: Mg 0.97%, Ti 4.1%, Al 5.1%, Cl 17.4%.

Example 5

A. Preparation of the Premixture 4 ml of n-heptane and 5.6 ml of titanium tetrabutoxide (Ti(O-Bu)$_4$) was added to 772 mg of anhydrous MgCl$_2$ during continuous stirring of the mixture. The mixture was boiled in a 105° C. bath for ½ hour for complete dissolving of the material.

B. Treating the Carrier Agent with Hexamethyl Disilazane 6.0 g of a silicon dioxide dehydrated at 800° C. (Davison degree 955) was elutriated into 60 ml of n-heptane. 0.78 ml of HMDS was added dropwise to the mixture during simultaneous stirring by means of a magnetic mixer. The mixture was refluxed in a 105° C. bath for 60 minutes and was dried at the same temperature under argon for 1.5 hours, whereby a dry freely flowing carrier agent powder was obtained.

C. Absorbing the Premixture into Silicon Dioxide

The premixture solution was transferred by siphoning dropwise into the carrier agent during thorough stirring of the carrier agent.

After the addition of the solution the mixture was further stirred for 24 hours at room temperature.

D. Treating the Precatalyst with Ethyl Aluminium Dichloride 3.86 ml of a 10% by weight pentane solution of EADC was added to 1 g of the precatalyst prepared above, was stirred for 20 minutes and dried by nitrogen blowing for ½ hour at room temperature.

The catalyst composition was: Mg 1.1%, Ti 4.8%, Al 5.4%, Cl 16.1%.

Example 6

A. Preparation of the Premixture 3 ml of heptane and 4.2 ml of Ti(OBu)$_4$ was added to 579 mg of anhydrous MgCl$_2$ and the subsequent procedure was the same as in example 5.

B. Treating the Carrier Agent with Hexamethyl Disilazane

The procedure was the same as in example 5.

C. Absorbing the Premixture into Silicon Dioxide

The procedure was the same as in example 5, except that the mixture was stirred only for 1 hour after the addition of the premixture solution.

D. Treating the Precatalyst with Ethyl Aluminium Dichloride 3.78 ml of a 10% by weight pentane solution of EADC was added to 1 g of the precatalyst prepared above, was stirred for 20 minutes and dried by nitrogen blowing for ½ hour at room temperature. The dry catalyst powder was further stirred for 23 hours.

The catalyst composition was: Mg 1.0%, Ti 4.5%, Al 5.1%, Cl 16.5%.

Example 7

A. Preparation of the Premixture 2 ml of heptane and 2.8 ml of Ti(OBu)$_4$ was added to 386 mg of anhydrous MgCl$_2$ and the procedure was the same as in example 5.

B. Treating the Carrier Agent with Hexamethyl Disilazane

The procedure was the same as in example 5 except that silicon dioxide dehydrated at 600° C. was used.

C. Absorbing the Premixture into Silicon Dioxide

The procedure was the same as in example 5, except that the mixture was stirred for 11 hours after the addition of the premixture solution.

D. Treating the Precatalyst with Ethyl Aluminium Dichloride (=example 7a)

4.51 ml of a 10% by weight pentane solution of EADC was added to 1 g of the precatalyst prepared above. The mixture was stirred for 20 minutes and dried in a 40° C. bath for 1 hour.

The catalyst composition was: Mg 0.8%, Ti 3.9%, Al 4.5%, Cl 15.1%.

D. Treating the Precatalyst with Ethyl Aluminium Sesquichloride (EASC) (=example 7b)

5.9 ml of a 10% by weight pentane solution of EASC was added to 1 g of the precatalyst prepared above. The mixture was stirred for 20 minutes and dried for 1 hour in a 40° C. bath.

The catalyst composition was: Mg 0.87%, Ti 4.4%, Al 6.7%, Cl 12.7%.

D. Treating the Precatalyst with Diethyl Aluminium Chloride (DEAC) (=example 7c)

8.7 ml of a 10% by weight pentane solution of DEAC was added to 1 g of the precatalyst prepared above. The mixture was stirred for 20 minuts and dried for 1 hour in a 40° C. bath.

The catalyst composition was: Mg 0.71%, Ti 3.85, Al 9.7%, Cl 14.3%.

Example 8

A. Preparation of the Premixture
  The procedure was the same as in example 7.
B. Treating the Carrier Agent with Hexamethyl Disilazane
  The procedure was the same as in example 5.
C. Adding Ethyl Aluminium Dichloride to the Carrier Agent.
  31.5 ml of a 10% by weight pentane solution of EADC was added on top of the silicon dioxide treated with hexamethyl disilazane, was stirred for 15 minutes and dried in a nitrogen gas flow for 1 hour.
D. Absorbing the Premixture into the Chlorinated Carrier Agent
  The premixture solution was transferred by siphoning dropwise into the carrier agent, which was stirred simultaneously by means of a magnetic mixer. The mixture was further stirred after the addition of the solution for 24 h at room temperature.
  The catalyst composition was: Mg 1.0%, Ti 4.6%, Al 5.3%, Cl 15.6%.

Example 9

A. Preparation of the Premixture
  The procedure was the same as in example 7.
B. Adding Ethyl Aluminium Dichloride to the Carrier Agent
  35 ml of a 10% by weight pentane solution of EADC was added to 6.0 g of a silicon dioxide dehydrated at 800° C. (W. R. Grace Co, Davison degree 955). The mixture was stirred in a 50° C. bath for 15 minutes and dried at the same temperature in a nitrogen gas flow for 1 hour.
C. Absorbing the Premixture into the Chlorinated Carrier agent
  The procedure was the same as in example 8.
  The catalyst composition was: Mg 0.75%, Ti 4.8%, Al 4.3%, Cl 12.2%.

Example 10

A. Preparation of the Premixture
  The procedure was the same as in example 7.
B. Treating the Carrier Agent with Triethyl Aluminium (TEA)
  36 ml of pentane was elutriated into 6.0 g of silicon dioxide dehydrated at 800° C. (Davison degree 955). 3.7 ml of a 10% by weight pentane solution of TEA was added to the slurry. The mixture obtained was stirred for 15 minutes and dried in a nitrogen gas flow at room temperature for 2 hours.
C. Absorbing the Premixture into Silicon Dioxide
  The premixture solution was siphonized dropwise into the carrier agent, which was simultaneously stirred by means of a magnetic mixer. After the addition of the solution, the precatalyst was stirred for 1 h 20 min at room temperature.
D. Treating the Precatalyst with Ethyl Aluminium Dichloride
  3.7 ml of a 10 % by weight pentane solution of EADC was added t 1 g of the precatalyst prepared above, was stirred for 20 min. and dried in a nitrogen gas flow in a 50° C. bath for 1.5 hours. The dry catalyst was stirred for 22 more hours.
  The catalyst composition was: Mg 0.76%, Ti. 3.5%, Al 4.8%, Cl 14.1%.

Example 11

A. Preparation of the Premixture
  The procedure was the same as in example 7.
B. Absorbing the Premixture into Silicon Dioxide
  The premixture solution was sihponized into 6.0 g of silicon dioxide dehydrated at 800° C. The mixture was stirred at room temperature for 1 hour and at 90° C. for 1 h 40 min.
C. Treating the Precatalyst with Ethyl Aluminium Dichloride
  3.46 ml of a 10% by weight pentane solution of EADC was added to 1 g of the precatalyst prepared above, was stirred for 20 min and dried in a nitrogen gas flow at room temperature for ½ hour. The dry catalyst powder was further stirred for 23 hours at room temperature.
  The catalyst composition was: Mg 0.7%, Ti 3.2%, Al 4.0%, Cl 13.5%.

Example 12

A. Preparation of the Premixture
  2.8 ml of Ti(OBu)$_4$ was added to 386 mg of anhydrous MgCl$_2$. The mixture was boiled in a 110° C. bath 3 hours in order to dissolve the material totally.
B. Treating the Magnesium Silicate Carrier with Hexamethyl Disilazane
  3.0 g of nitrified magnesium silicate was elutriated into 15 ml of pentane. 3.75 ml of HMDS was added to the slurry. The mixture was stirred in a 50° C. bath for 1 hour and dried a nitrogen gas flow for ½ hour.
C. Absorbing the Premixture into the Carrier Agent
  The premixture solution was siphonized dropwise into the carrier agent, during thorough stirring of the carrier agent. After the addition of the solution, the precatalyst was stirred for 3 hours.
D. Treating the Precatalyst with Ethyl Aluminium Dichloride
  The precatalyst prepared above was treated with EADC in two steps.
  Step 1: 10 ml of a 10% by weight pentane solution of EADC was added to the total amount of precatalyst, was stirred for 40 min and dried in a nitrogen gas flow at room temperature for 2 hours. 5.7 g of a dry yellowish brown catalyst was obtained, which contained 1.7% of Mg, 5.7% of Ti, 2.2% of Al and 9.6% of Cl.
  Step 2: 1 g of the catalyst obtained in step 1 was taken, into which 3 ml of pentane and 3.3 ml of a 10% by weight pentane solution of EADC was added. The slurry was stirred for 20 min. and dried in a nitrogen gas flow at room temperature for 1 hour. The dry catalyst powder was additionally stirred for 1 hour.
  The catalyst composition was: Mg 1.5%, Ti 4.7%, Al 5.5%, Cl 19.25.

Example 13

A. Treating the Carrier with Hexamethyl Disilazane
  18.0 g of silicon dioxide dehydrated at 800° C. (W. R. Grace Co, Davison degree 955) was elutriated into 180 ml of heptane. 3.0 ml of HMDS was added dropwise to the mixture during continuous stirring. The mixture was refluxed in a 105° C. bath for 60 minutes, was dried and washed once with 70 ml of heptane and two more times with 70 ml of pentane. The washed carrier agent was dried in a nitrogen gas flow for 7.5 hours.
B. Adding the Mg and Ti Compounds to the Carrier Agent
  193 mg of magnesium chloride, 2.5 ml of heptane and 0.7 ml of titanium tetrabutoxide was added to 1.5 g of silicon dioxide treated with HMDS. The mixture was stirred in a 105° C. bath for 6 hours.
C. Treating the Precatalyst with Ethyl Aluminium Dichloride 7.89 ml of a 10% by weight pentane solution of EADC was added to the precatalyst prepared above, was stirred for 20 minutes and dried in a nitrogen gas flow for ½ hour. The dry catalyst powder was further stirred for 23 hours at room temperature.

The catalyst composition was: Mg 1.75, Ti 3.95, Al 3.5%, Cl 13.85.

Example 14 (Vanadium Catalyst)

A. Preparation of the Premixture 4 ml of heptane and 1.54 ml of $VOCl_3$ was added to 772 mg of anhydrous $MgCl_2$. The mixture was boiled in a 105° C. bath for 6 hours.

B. Treating the Carrier with Hexamethyl Disilazane

The procedure was the same as in example 5.

C. Absorbing the Premixture into Silicon Dioxide

The premixture solution was transferred by means of an injector to the carrier agent and 2 ml of heptane was added to the mixture. The dry catalyst powder was stirred for 23 hours at room temperature.

D. Preactivating the Procatalyst with Ethyl Aluminium Dichloride 2 ml of pentane and 2.38 ml of a 10% by weight pentane solution of EADC was added to 1 g of the catalyst prepared above, the mixture was stirred for 15 min and dried in a nitrogen gas flow at room temperature for ½ hour.

The catalyst composition was: Mg 1.3%, V 7.0%, Al 4.4%, Cl 29.7%.

Polymerization

1. Test Polymerization of Ethene 2.1 l of n-pentane dried with active aluminium oxide and molecule screens was introduced into a 3 liter reactor. After that 50 mg of the procatalyst elutriated into a small amount of pentene was added through a feeding funnel into the reactor and the temperature was raised to 80° C.

A 0.5 liter vessel was pressurized with hydrogen to a 5 bar pressure. This hydrogen quantity was fed into the reactor together with a 10% by weight pentane solution of triethyl aluminium acting as a cocatalyst and an ethene gas acting as a monomer. The total pressure was raised with the aid of ethene to 15 bars, the temperature was raised to 90° C. and the polymerization was continued for 60 min. Ethene was continuously fed into the reactor in order to keep the pressure constant.

2. Copolymerization

The copolymerization of ethene and alfa-olefines was carried out in the same manner as the polymerization, except that the comonomer (300 ml of 4-methyl 1-pentene) was added to the medium (1800 ml of n-pentane) immediately after the addition of the catalyst slurry.

The polymerization results obtained with catalyst systems according to examples 1–14 are presented in the table.

We claim:

1. A process for the preparation of an alpha-olefin polymerization procatalyst by treating an inorganic carrier, from which any surface hydroxyl groups have been completely or partially removed, with a complex solution of $MgCl_2$ and a $Ti(OR)_4$ compound, wherein R is an alkyl group, characterized in that the treatment comprises the steps of 1) impregnating said carrier with a hydrocarbon solution containing both the $MgCl_2$ and the $Ti(OR)_4$ compound by mixing the carrier with the solution and then evaporating the hydrocarbon so that all of the $MgCl_2$ and $Ti(OR)_4$ compounds remain on the support, and 2) contacting the impregnated carrier with an alkyl aluminum chloride compound or
   A) contacting said carrier with an alkyl aluminum chloride compound, and
   B) impregnating the contacted carrier with a hydrocarbon solution containing both the $MgCl_2$ and the $Ti(OR)_4$ compound by mixing the carder with the solution and then evaporating the hydrocarbon so that all of the $MgCl_2$ and $Ti(OR)_4$ compounds remain on the support, wherein, in the treatment, essentially all of the titanium is brought to the carrier in the form of $Ti(OR)_4$.

2. Process of claim 1, characterized in that the inert carrier is an Al, Si, Ti, Mg or Cr oxide or mixture of them.

3. Process of claim 1, characterized in that the inert carrier is silica ($SiO_2$) or a Mg silicate.

4. Process of claim 1, characterized in that the carrier hydroxyl groups have been removed by an organic silicon, aluminum, zinc, phosphorus and/or fluorine compound.

5. Process of claim 4, characterized in that the compound used to remove the carrier hydroxylic groups is hexamethyl disilazane.

6. Process of claim 1, characterized in that the $Ti(OR)_4$ compound is $Ti(OBu)_4$.

7. Process of claim 1, characterized in that the alkyl aluminum chloride is ethyl Al dichloride or ethyl Al sesquichloride, characterized in that the carder hydroxyl groups have been removed by an organic silicon compound or an aluminum compound.

* * * * *